United States Patent [19]
Hicks et al.

[11] Patent Number: 6,100,892
[45] Date of Patent: Aug. 8, 2000

[54] ATMOSPHERIC EFFECTS SIMULATION

[75] Inventors: Timothy J. Hicks, Haywards Heath; Graham J. Olive, Burgess Hill; Paul H. Berridge, Hove, all of United Kingdom

[73] Assignee: Thomson Training & Simulation Limited, West Sussex, United Kingdom

[21] Appl. No.: 08/983,333

[22] PCT Filed: Jun. 24, 1996

[86] PCT No.: PCT/GB96/01484

§ 371 Date: Mar. 13, 1998

§ 102(e) Date: Mar. 13, 1998

[87] PCT Pub. No.: WO97/03417

PCT Pub. Date: Jan. 30, 1997

[30] Foreign Application Priority Data

Jul. 7, 1995 [GB] United Kingdom .................. 9513895

[51] Int. Cl.$^7$ .................................................. G06T 17/00
[52] U.S. Cl. ............................................................. 345/419
[58] Field of Search ..................................... 345/418, 419, 345/420, 421, 422, 423, 424, 425

[56] References Cited

U.S. PATENT DOCUMENTS

| | | |
|---|---|---|
| 4,463,380 | 7/1984 | Hooks, Jr. . |
| 4,811,245 | 3/1989 | Bunker et al. . |
| 5,366,376 | 11/1994 | Copperman et al. . |
| 5,415,549 | 5/1995 | Edward . |

OTHER PUBLICATIONS

"Sampling and Anti–Aliasing of Discrete 3–D Volume Density Textures", G. Sakas et al, Computers and Graphics, vol. 16, No. 1, Jan. 1, 1992, pp. 121–134.

*Primary Examiner*—Phu K. Nguyen
*Assistant Examiner*—Cliff N. Vo
*Attorney, Agent, or Firm*—Nixon & Vanderhye P.C.

[57] ABSTRACT

The motion of particles such as snow is simulated in a computer generated image which represents the appearance from a predetermined viewing point of a three-dimensional worldspace through which the particles move. A three-dimensional model is defined which is made up from a regular array of abutting cubes of predetermined dimension. An object is defined which dimensions correspond to the dimensions of each cube, the object having characteristics such that it represents the motion of particles through the volume which it occupies. The three-dimensional model made up of the array of cubes is notionally positioned in worldspace such that the viewing point is located within a region of the model selected such that the field of view of particles from the viewing point is always within the model. As the viewing point travels through worldspace, it is translated in steps with the magnitude of each step corresponding to the length of any one side of the cubes. The model is moved in worldspace so as to maintain the viewing point within the selected region of the model. The image which is generated includes the model in which the object representing the moving particles occupies each of the cubes. The visibility of the cubes is faded out with distance from the viewing point so as to conceal the boundaries of the model. The model is positioned relative to the viewing point such that a notional point on a line drawn through the viewing point in a predetermined direction relative to the viewing point motion is always within a predetermined central region of the model. The distance between the notional point and the viewing point is a function of the speed of movement of the viewing point.

14 Claims, 7 Drawing Sheets

ATMOSPHERIC EFFECTS SIMULATION

BACKGROUND OF THE INVENTION

1. Field of the Invention

The present invention relates to an apparatus and method for simulating the appearance of atmospheric effects such as snow in a computer generated image.

2. Related Art

Simulators are well known which are capable of generating an image on a screen used by for example a trainee pilot. The image is generated from a database of digital information representing for example terrain and buildings as they appear from a viewpoint which may move relative to the terrain. The digital data thus represents a model of a worldspace and the images are representative of the appearance of that worldspace from a particular position. Generally the model will be based on a series of planar polygonal objects of known geometry, position, orientation and surface attributes. Examples of such systems are described for example in U.S. Pat. Nos. 5,363,475 and 5,412,796. The first of these two U.S. patents describes the basic operation of an image generator in terms of dealing with the processing of objects including light points in real time, whereas the second deals with the simulation of atmospheric fog.

The simulation of atmospheric effects such as fog and snow is considered to be of a real significance given the impact that such effects can have on the ability of a pilot to monitor aircraft movements by reference to the view from the aircraft. No realistic simulations of layered fog were available until an implementation of the invention in accordance with U.S. Pat. No. 5,412,796 recently become available. Attempts to provide realistic simulations of snow have to date not been successful. Whereas fog can be represented as effects having the same characteristics over a substantial volume of space, snow by its very nature must be represented as a series of discrete elements, and those elements cannot move in a uniform manner if realism is to be achieved. Whereas in non-real time systems any required level of detail can be produced providing sufficient computing power and time is available, this is not the case in real time systems where the computational resources available to generate a single image are necessarily limited.

One snow simulator has been displayed which represents the appearance of snow falling in the vicinity of an aircraft on the ground. Individual flakes of snow were represented by light points strings of which were generated in a similar manner to that adopted in conventional systems for the simulation of the lights of moving vehicles following each other along a road. Effectively the snow was represented as a large number of light points moving within a limited volume of worldspace within which the simulated aircraft was stationary. Although such a system was successful in providing a realistic image in these limited circumstances, it could not provide a realistic simulation in a sufficiently large volume of worldspace to enable the realistic simulation of the appearance of snow through which an aircraft is moving.

In an attempt to provide a realistic simulation of snow, the above model relying upon light points was developed by relying upon repeating modules of snow, each module including a set of light strings to simulate snow flakes and each module representing a segment of a three-dimensional torus made up by an array of modules. The viewing point was located within a module of the torus, and the torus was moved in translation with the viewing point. The relative movement between individual snow flakes and the viewing point was achieved by rotating the torus about its centre such that the viewing point appeared to move through successive modules. This approach was adopted as it enables relative movement between the torus and the viewing point to take account of both movement of individual snow flakes in worldspace and movement of the viewing point relative to that worldspace. In some circumstances this arrangement provided satisfactory results, for example when flying straight, as in those circumstances a simple rotation of the snow "torus" was able to achieve the correct movement between individual particle of snow and the viewing point. Unfortunately, when the aircraft executed a turn, particularly when moving on the ground where sharp turns are common, it was not possible to realistically represent movement of snow across the field of view represented on the viewing screen of the simulator. The snow model "turned" with the aircraft in a completely unrealistic manner. Thus although some systems relying upon the snow torus model described above were distributed, some users found them unsatisfactory.

SUMMARY OF THE INVENTION

It is an object of the present invention to obviate or mitigate the problems outlined above.

According to the present invention, there is provided a method for simulating the motion of particles in a computer generated image representing the appearance from a predetermined viewing point of a three-dimensional worldspace through which the particles move, wherein a three-dimensional model is defined which is made up from a regular array of abutting model portions of predetermined dimensions, an object is defined the dimensions of which correspond to the dimensions of each model portion, the object having characteristics such that it represents the motion of particles through the volume which it occupies, the three-dimensional model is notionally positioned in worldspace such that the viewing point is located within the model, the field of view from the viewing point extends through the model, and a notional point which is in a predetermined location relative to the viewing point is within a selected region of the model, the worldspace model position is translated in steps, the magnitude of each step corresponding to the dimensions of the portions, and the model being translated in response to movements of the viewing point in worldspace so as to maintain the notional point within the selected region, and an image of the worldspace including the model is generated with the object representing the moving particles occupying each portion of the model.

The present invention also provides an apparatus for simulating the motion of particles in a computer generated image representing the appearance from a predetermined viewing point of a three-dimensional worldspace through which the particles move, comprising means for defining a three-dimensional model which is made up from a regular array of abutting model portions of predetermined dimensions, means for defining an object the dimensions of which correspond to the dimensions of each model portion, the object having characteristics such that it represents the motion of particles through the volume which it represents, means for notionally positioning the three-dimensional model in worldspace such that the viewing point is located within the model, the field of view from the viewing point extends through the model, and a notional point which is in a predetermined location relative to the viewing point is within a selected region of the model, means for translating the worldspace model position in steps the magnitude of each of which corresponds to the dimensions of the portions, the translating means being responsive to movements of the viewing point in worldspace so as to maintain the notional point within the selected region, and means for generating an image of the worldspace including the model with the object representing the moving particles occupying each portion of the model.

As the viewing point will always be within the model, and that model will move in steps without there being any abrupt or discontinuous change in the particle distribution in the field of view, a realistic image may be generated. Individual regions of the model are self-similar, and therefore the fact that the model might have moved relative to the viewing point between successive images is not perceived.

The particles may be snowflakes, raindrops or the like. The notional point may be coincident with the viewing point. The distance between the notional point and the viewing point may be a function of viewing point speed. Thus the notional point may be envisaged as a point located at the end of an imaginary telescopic pole extending from the viewing point. In the case of simulating the view from an aircraft, the imaginary pole will extend in front of the viewing point parallel to the fore and aft axis (U-axis) of the simulated aircraft.

The model orientation is fixed in worldspace such that the model does not rotate with rotations of the viewing point. Individual model portions preferably will be simple cubes within each of which there is a distribution of particles of predetermined structure. Each cube may be made up from a series of sub-cubes each of which has a different distribution of particles from its neighbours.

Although the model portions or cubes are referred to as abutting, and the model is translated in steps corresponding to the dimension of these abutting cubes, the particle distribution represented by each cube may extend beyond the cube boundaries so that there is overlap between the particle distributions in adjacent cubes. This smoothes out the edges of the cube structure. The visibility of individual cubes may be faded out with range to conceal the external boundaries of the model structure.

The particles may be represented by respective light points, for example raster or calligraphic light points. The light points may be in strings such that the light points of each string move in unison. Alternatively, the particles may be represented by polygons, for examples triangles.

DETAILED DESCRIPTION OF EXEMPLARY EMBODIMENTS

Figure 1:
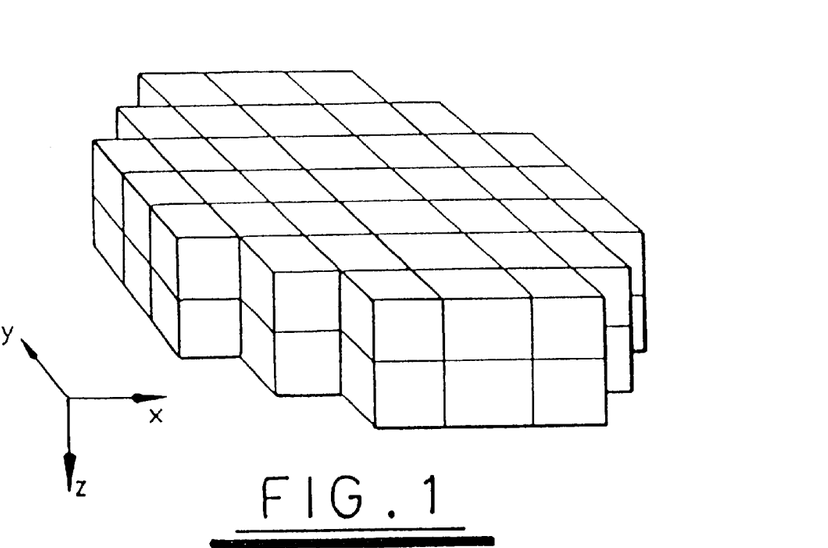
FIG. 1 is a representation of a snow model made up of an array of cubes, the model being used in one embodiment of the present invention.

FIG. 1 is a three-dimensional representation of a model made up from seventy four cubes arranged in two layers. The model is used to simulate snow in a simulator which generates an image of a worldspace through which an aircraft flies. Assuming a worldspace co-ordinate system x, y, z as represented in FIG. 1, the model will move through worldspace in the directions of each of the three axes but will not rotate relative to these axes. Accordingly the edges of each cube will always be parallel to one of the three axes. Each cube portion of the model structure is occupied by an identical object representing the movement of snow within a volume corresponding to the volume of the cube. Typically each cube will have one hundred foot sides such that the model structure is two hundred feet high.

Figure 2:
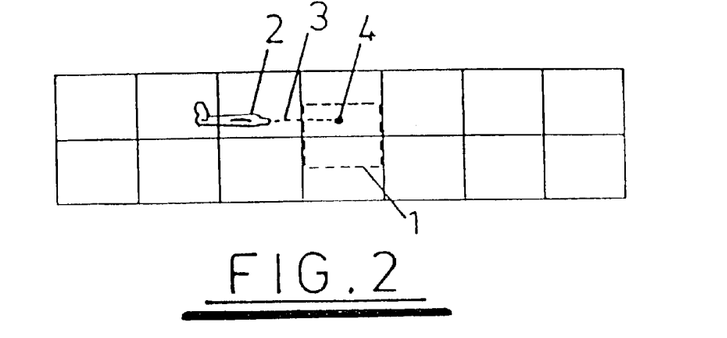
FIGS. 2 and 3 are side and plan views of the model of FIG. 1 representing the notional position relative to the model of an aircraft the view from which is to be simulated.
Figure 3:
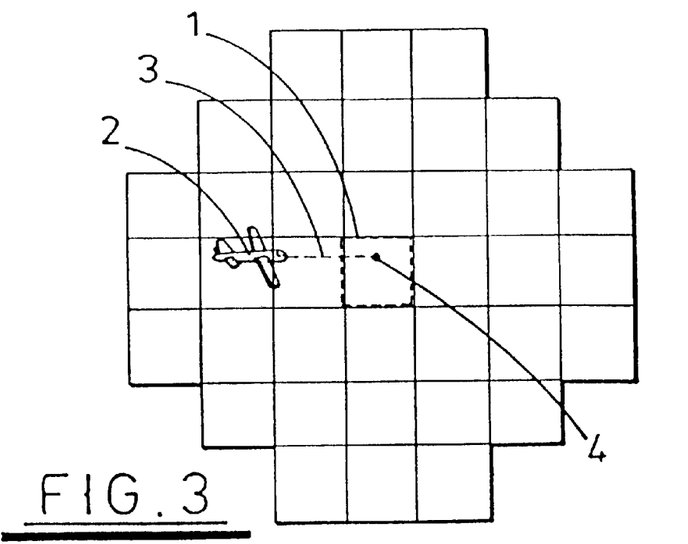

FIG. 2 is a side view of the model structure of FIG. 1, and FIG. 3 is a plan view of the model structure of FIG. 1. In FIGS. 2 and 3, a notional space 1 which is located centrally with respect to the model structure has been outlined by a broken line. The space is a notional one hundred foot cube half of which is located in the upper layer of cubes and half in the lower layer of cubes.

A representation 2 of an aircraft is also shown in FIGS. 2 and 3, the broken line 3 representing the U-axis (fore and aft axis) of the aircraft relative to the worldspace within which the model is fixed. A point 4 is located on the line 3 which extends from a viewing point which is within the aircraft 2. The spacing between the viewing point and the point 4 is a function of aircraft speed.

The system operates such that the model is translated through worldspace to ensure that the point 4 is always located within the region 1. As part of its normal processes, the image generator calculates the worldspace coordinates of the simulated aircraft, and movements of the model are such as to maintain the require relationship between the position of the point 4 and the region 1. The model is translated in steps each of which is equal in length to the side dimension of each of the cubes. This is illustrated in FIG. 4.

Figure 4:
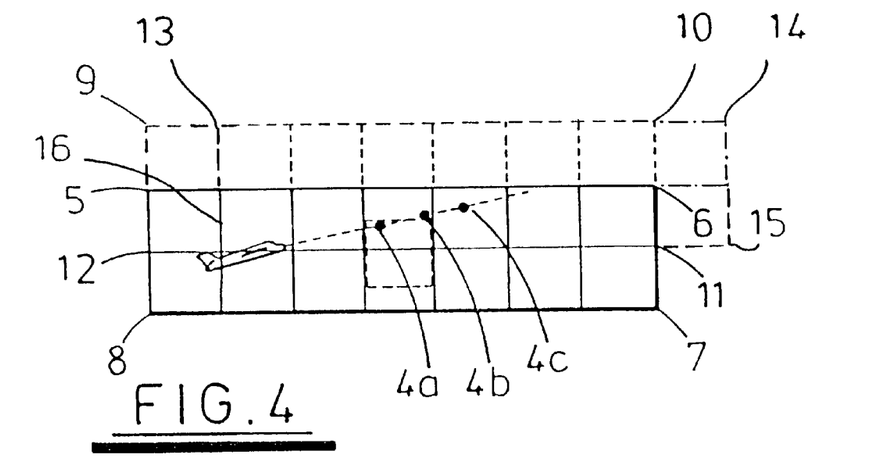
FIG. 4 illustrates the movement of the model through worldspace as the aircraft moves.

Referring to FIG. 4, when the point 4 is at position 4a, the model structure is positioned with its corners at points 5, 6, 7 and 8. When the point 4 is at position 4b, to maintain that point inside the central area 1 the model has been moved to a position such that its corners are at points 9, 10, 11 and 12. This effectively moves the central area of the model structure vertically upward by one hundred feet such that the point 4 remains within the central region of the structure. When the point 4 has reached the position 4c, the model structure has again been moved to maintain the point 4c within the central portion of that structure. As a result the model structure is in a position such that its corners are at points 13, 14, 15 and 16. Thus is can be seen how the model structure follows the aircraft through notional worldspace so as to always ensure that the model structure is at an appropriate position around the viewing point.

The spacing between the viewing point and the point 4 is adjusted in dependence upon aircraft speed in order to provide sufficient time advance to enable the processing of individual cubes of the structure by the associated image generator. When the aircraft is stationary on the ground the viewing point will be located in the central region 1, the spacing between the viewing point and the point 4 being increased to for example two hundred feet when the aircraft is cruising. Thus the point 4 is positioned as if it were mounted on the end of a telescopic pole extending parallel to the aircraft U-axis, the length of the pole being a function of aircraft speed. Therefore the point 4 is already dead ahead of the aircraft windshield.

Figure 5:
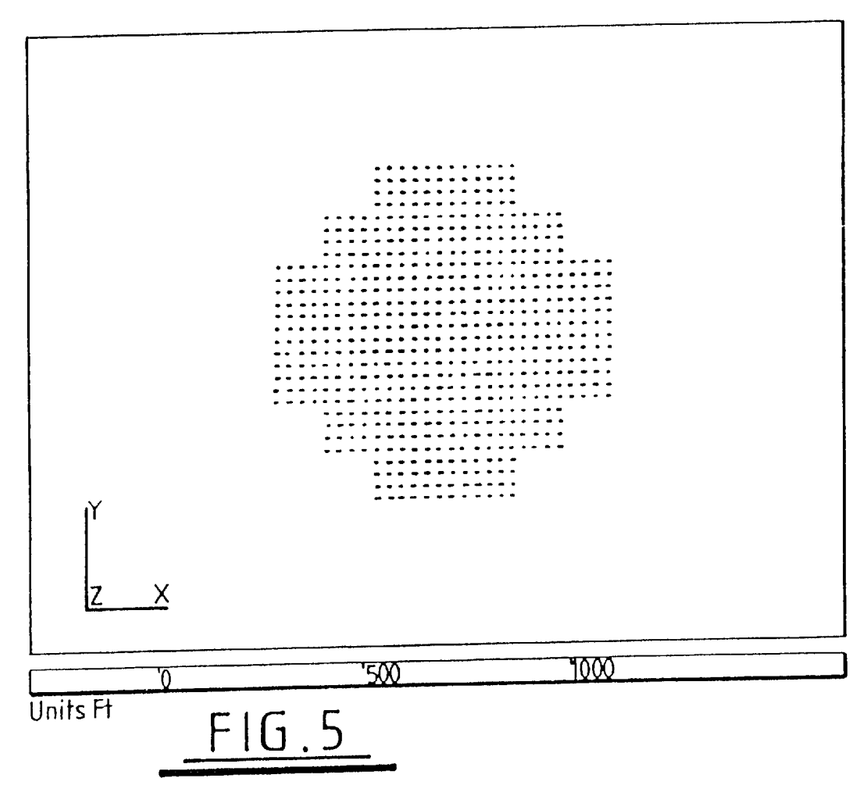
FIG. 5 is a plan view representing the distribution of sub-cubes in the model of FIG. 1.

FIG. 5 is a plan view of the structure of FIG. 1 with each of the cubes being represented by an array of sixteen dots.

In fact each cube is made up of a total of sixty four sub-cubes, that is four layers of sixteen cubes, with each of the sub-cubes defining a different distribution of snow flakes. The dots shown in FIG. 5 represent the centres of individual sub-cubes.

Figure 6:
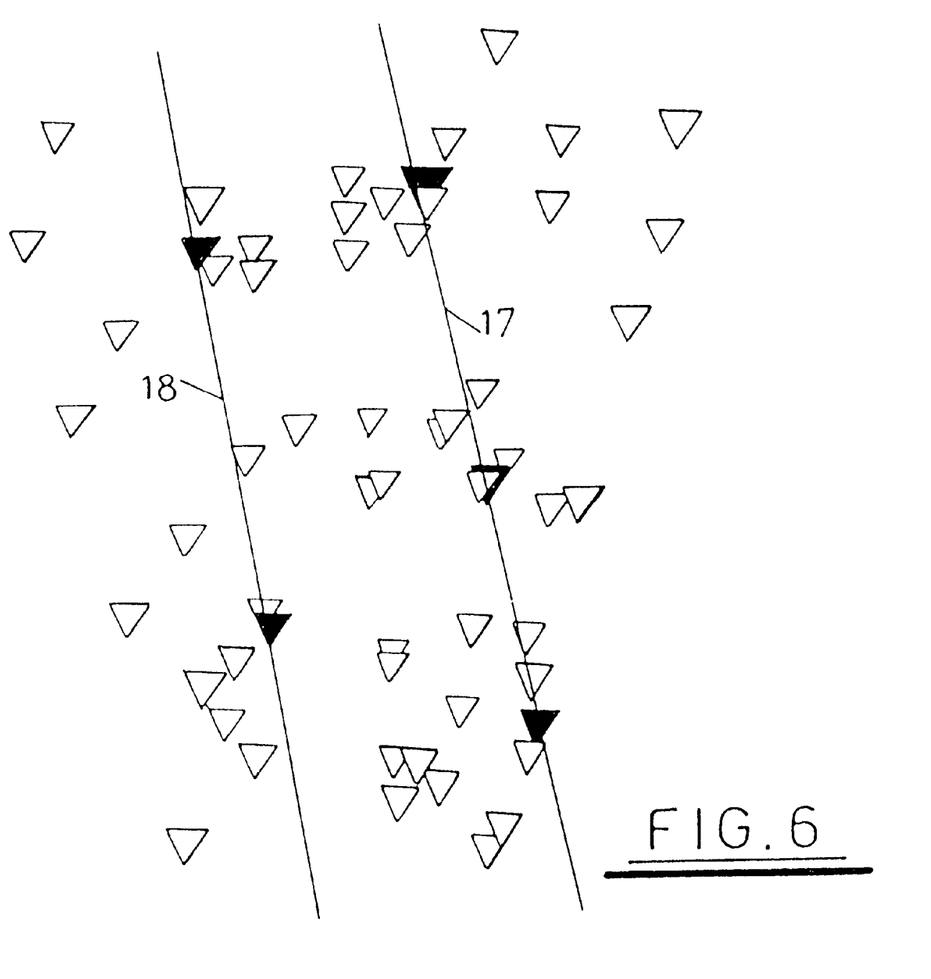
FIGS. 6, 7 and 8 are views in mutually perpendicular directions representing the positions of simulated snowflakes in one sub-cube.
Figure 7:
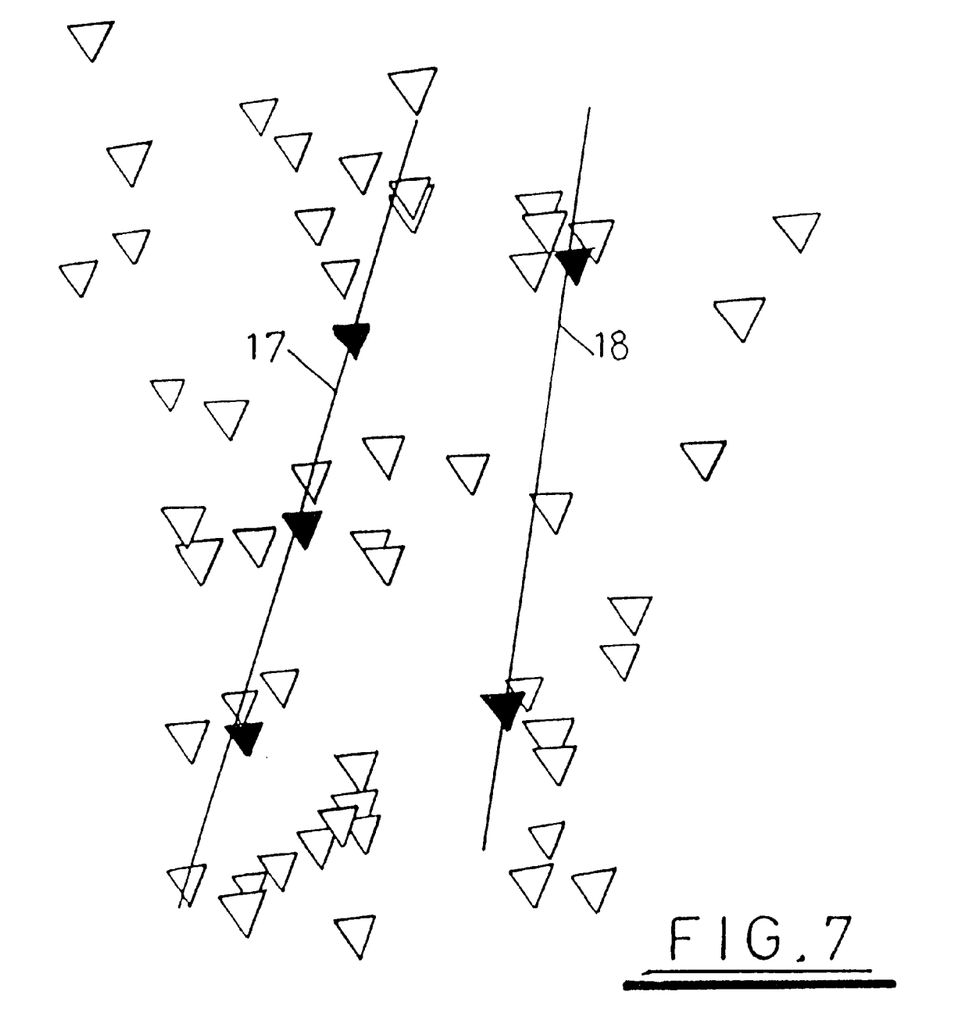
Figure 8:
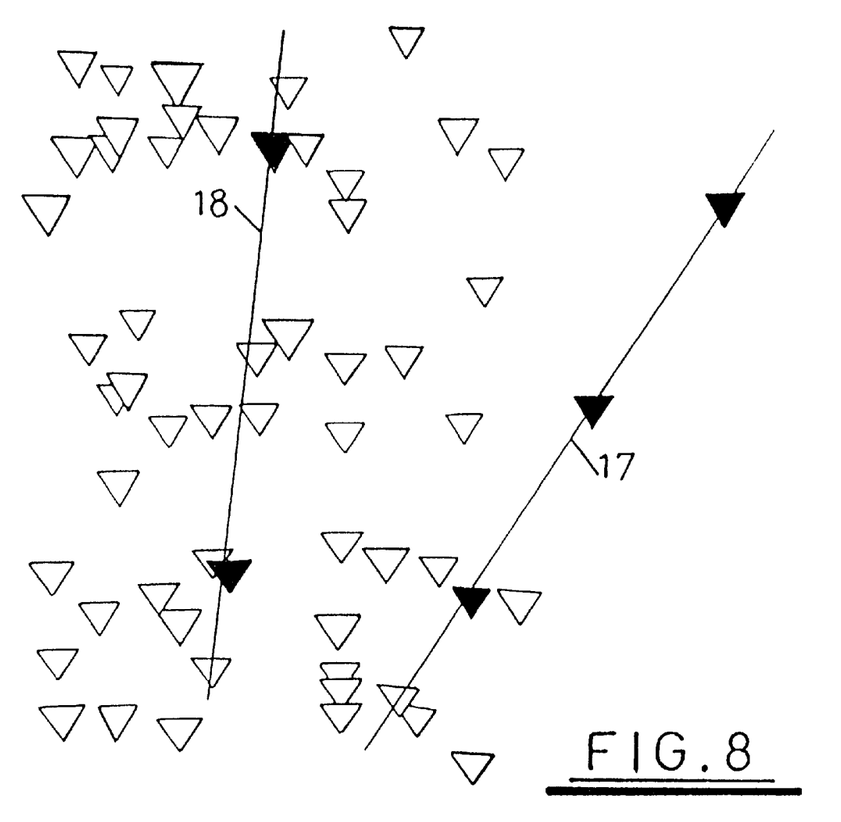

FIGS. 6, 7 and 8 are views in mutually perpendicular directions of the distribution of snow flakes in an individual sub-cube. Each triangle in FIGS. 6 to 8 represents the position of a single snowflake. The snowflakes are defined as strings of light points located on respective straight lines, five of the triangles being shaded in FIGS. 6 to 8 to represent two strings of snow flakes, one comprising three flakes and one comprising two flakes, located on lines 17 and 18 respectively. The flakes in each string move in unison, but the flakes in one string can move in a different manner to the flakes in another string. Accordingly complex effects can be achieved.

Figure 9:
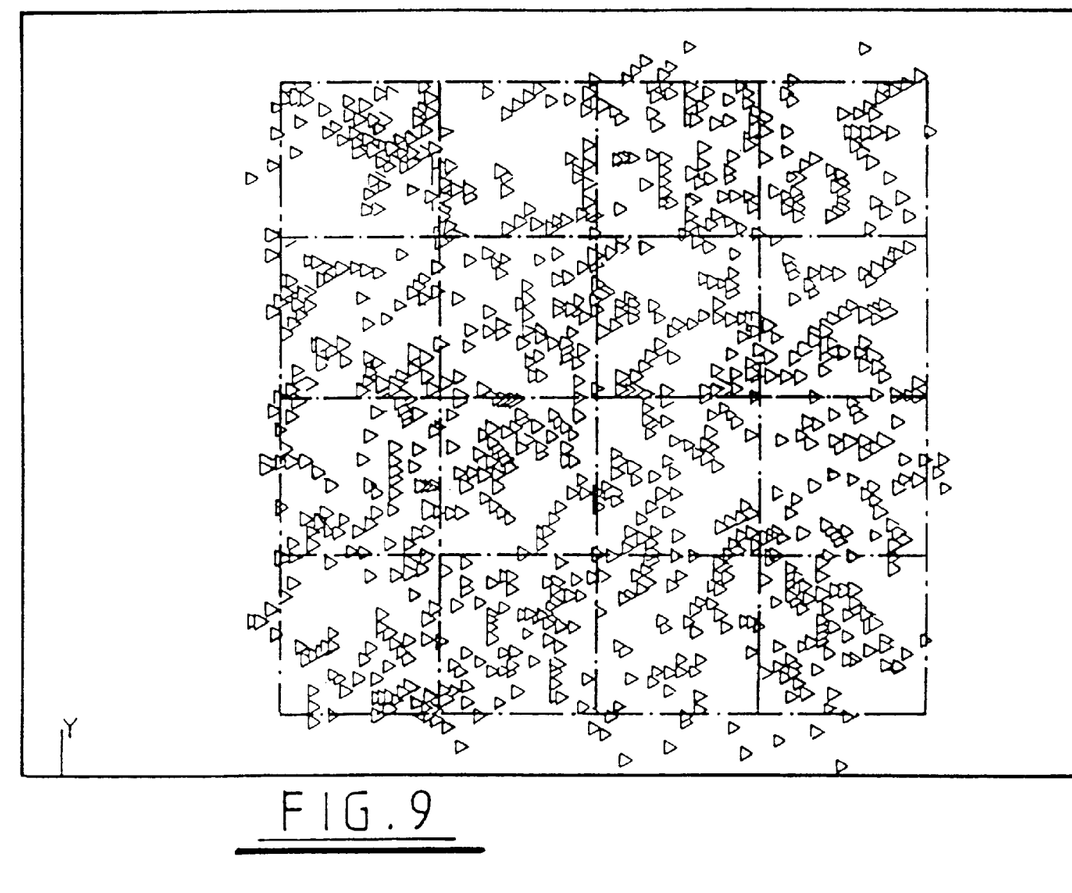
FIG. 9 represents the view from above of a layer of sixteen sub-cubes making up one side of a cube of the model of FIG. 1

FIG. 9 is a plan view of the top sixteen sub-cubes of one cube, with the boundaries of the cubes indicated by lines. It will be seen that there is overlap between the light points of adjacent sub-cubes, and therefore there will be overlap between the light points of adjacent cubes. Typically the light points of any one twenty five foot sub cube will be located within a thirty three foot notional cube. Therefore although the cubes defining the structure of FIG. 1 abut and do not overlap, the snowflake distributions represented by the cubes do overlap. This reduces the possibility of the generated image including "popping" effects, that is the sudden appearance of a representation of snow in a region where there was previously no snow.

Each cube is broken down into an array of sub-cubes to reduce redundant processing. Each sub-cube will be allocated a visibility dependent upon its range from the viewing point. Accordingly any sub-cubes more than say three hundred feet away from the viewing point will not be processed by the image generator.

The individual snowflakes are represented by techniques familiar to the designers of image generators which are used for simulating the appearance of moving strings of lights. A moving light string is a sequence of points which continually moves along a defined path, the points appearing at a start point Ps and disappearing at an end point Pe. In a typical image generator the following attributes may be defined for a light string:

a) Start and end Points in three dimensional space (Ps:Xs, Ys, Zs Pe:Xe, Ye, Ze)
b) The path of motion (straight or curved) between Ps and Pe
c) the speed of motion
d) the spatial separation or temporal interval between points
e) the intensity, colour, directionality and fade-out range of the points A typical application is for simulating vehicular traffic along a freeway. In such an application the lights are modelled white and red so as to present head-lights or tail-lights depending upon orientation relative to the viewer eye-point. In the present use of snow simulation the lights are used to represent falling particles (e.g. snow flakes) that move along a given trajectory, appearing at the ceiling height of the cube structure and disappearing at the floor height. Their omni-directional intensity is controlled to represent ambient or aircraft landing light illumination.

The image generator maintains a centralised real-time clock "T_abs" that tracks true elapsed time. All moving string processing refers back to this datum such that multiple copies of a single object will behave in an identical manner. Furthermore each channel of a multi-channel image generator will have access to T_abs to guarantee absolute synchronism in string processing across channels.

The following description covers the simplest case of a single omni-directional light on a straight line path. Similar techniques exist for multiple points or curved paths.

| Attribute data: | | |
| --- | --- | --- |
| Start point | Ps (Xs. Ys. Zs) | ft |
| End point | Pe (Xe. Ye. Ze) | ft |
| Point speed | V | ft/sec |
| Deduced data: | | |
| Line Length | L (computed from Pe − Ps) | ft |
| Point Interval | P (computed from L/V) | sec |
| Variables: | | |
| Current string time | T_string | sec |

The following calculations are conducted each image generator update frame: The current T_string is computed from the string interval P and T_abs.

$$T\_string = MOD(T\_abs, P)$$

where MOD is the modulus operator that produces the remainder of the quotient T_abs/P (zero results when there is an exact division without a remainder).

The line ratiometric position r is computed from:

$$r = T\_string/P$$

where r increases linearly from 0.0 (at Ps) to 1.0 (at Pe). The current position Pp on the line path is given by:

$$Pp = Ps + r*(Pe - Ps)$$

i.e.

$$Xp = Xs + r*(Xe - Xs)$$

$$Yp = Ys + r*(Ye - Ys)$$

$$Zp = Zs + r*(Ze - Zs)$$

The Pp coordinates then undergo standard graphics perspective divide, clipping and scaling to create a point in two dimensional screen space. The fade-range attribute is used to determine when points become too dim to perceive and may be discarded from the display.

The point may be displayed as a raster light point or a calligraphic light point depending upon the image generator and display capability. Generally raster light points will be displayed, as the high quality achievable with calligraphic light points is not required for the emulation of snow. A series of light strings each generated as described above is produced for each sub-cube to produce a distribution such as is illustrated in FIGS. 6 to 8. The sixty four sub-cubes together define a cube which is repeated in each cube making up the model structure shown in FIG. 1. The image generator processes each sub-cube within range just as it processes any object within worldspace to produce the required image information. Thus multiple copies of each sub-cube are produced, one being used in each cube. These multiple copies behave in exact synchronism, even across channels of a multi-channel image generator. This allows the image generator to "jump" into any repeat of the snow structure without any discontinuities being discernible.

Any convenient approach may be adopted to generate a set of strings suitable for use in a individual sub-cube. For example, a simple program can be written to generate a randomised series of strings, the program relying upon for example a random seed to ensure differences between successively generated sub-cubes, ranges for the boundaries of the sub-cube within which all the sub-cube light points must be located (to provide for variable overlap between adjacent sub-cubes), a selected number of light points, a range of acceptable angles of the light strings, a range of intervals between light points in individual strings, and range of speeds for the light points. Thus highly complex and irregular patterns can be readily developed.

The image generator host software stores details of the snow effects which are to be represented, and performs the necessary computations to integrate the snow with the other features of the represented scene. The computational processes are conventional and may for example follow the procedures such as described in U.S. Pat. No. 5,363,475. Details are given below however of particular computations which are necessary to provide information specific to the snow simulations.

As is conventional, aircraft space, that is the space in a coordinate system having its origin at the aircraft centre of gravity, is represented as (U,V,W). Velocities UA, VA and WA represent the motion of a snow particle relative to the aircraft due to the combined effects of air speed, wind speed and turbulence. These velocities are relative to the aircraft axes U, V and W and are with respect to the aircraft centre of gravity. A flight freeze function may be available, and when this is invoked the snow particle motion will be the result of wind speed and turbulence only.

These snow particle velocity components are multiplied by the frame period TIME (which may be variable) to create a display screen vector SNPU, SNPV and SNPW representing the distance moved since the previous image generation cycle. This displacement vector is rotated from aircraft axes to worldspace axes to create a delta distance moved in worldspace using a rotation matrix as follows to create the snow particle position:

Snow particle Northing SNPNG=SNPNG+(SNPU*BE11+ SNPV*BE21+SNPW*BE31)

Snow particle Easting SNPEG=SNPEG+(SNPU*BE12+ SNPV*BE22+SNPW*BE32)

Snow particle height SNPHD=SNPHD+(SNPU*BE13+ SNPV*BE23+SNPW*BE33)

The above rotation matrix is conventional, as is the notation used to represent that matrix.

The point which is represented as point 4 in FIG. 2, 3, and 4 and is located on a line drawn in the U-axis direction through the eye point is referred to hereafter as the centring point. The centring point is projected ahead of the eyepoint at a distance of from zero to two hundred feet in dependence upon VT which represents the true air speed. At low speeds the centring point is near the eye point but extends ahead away from the eyepoint with increasing speed until a limiting speed SNVLK is reached. SNVRG is the linear speed ratio gain, that is the ratio of the true air speed to the limiting speed limited to a maximum of unity.

To calculate the height displacement from the aircraft origin of the centring point the following transformation is performed;

| SFPHD = | (PEXAC + (SNFPX*SNVRG) | )*BE13 + |
| | (PEYAC | )* BE23 + |
| | (PEZAC | )* BE33 |

SFPHD represents the centring point height displacement in world space relative to the aircraft. The pilots eye position in aircraft space is represented by PEXAC, PEYAC, and PEZAC. The centring point displacement along the aircraft U-axis is given by (SNFPX*SNVRG), where SNFPX is the maximum distance of the centring point from the eye and SNVRG is the linear velocity ratio gain. The rotation into worldspace is given by BE13, BE23 and BE33. Similar calculations are made in respect of Northing and Easting.

The centring point components are then compared with SNPNG. SNPEG and SNPHD and the cube repeat dimension (one hundred feet) is added or subtracted until the central portion of the cube structure is positioned over the centring point. Hysteresis is present in this mechanism so as to prevent potential oscillatory behaviour. This is achieved in respect of the height dimension as follows;

DO WHILE(SNPHD·GT·(SFPHD+SNRHY))

SNPHD=SNPHD−SNR

END DO

DO WHILE(SNPHD·LT·(SFPHD−SNRHY))

SNPHD=SNPHD+SNR

END DO

In the above, SNR is the dimension of each cube in the structure (one hundred feet), SNRHY is SNR/2+5% to provide the hysteresis to stop oscillatory switching.

Thus the necessary information required for correctly positioning the snow structure relative to the viewing point may be readily achieved.

The centring point is close to the eye when performing ground handling tasks as this ensures that rapid or large heading changes are possible within the cube structure without unnecessary cube jumping. The centring point is however for example two hundred feet ahead of the eye when cruising. This provides the image generator with sufficient feed-forward or time advance to process snow cubes prior to the three hundred foot visibility range. It should be noted that the dynamic extension of the distance between the eyepoint and the centring point only controls the position of the cube structure relative to the eyepoint and does not itself impart any perceivable cue.

Because the cube structure has fixed Euler angles and thus does not rotate relative to worldspace, when the eye rotates about the centre of gravity the snow behaves as any other earth aligned model.

Although the foregoing description has implied that the snow is moved relative to the eye, in fact it becomes apparent that the snow is largely stationary relative to worldspace and the aircraft normally is flying though the cube structure which jumps one hundred feet as required to maintain immersion of the eyepoint. In theory the only earth relative motion is produced by the wind component, which is insignificant at higher air speeds.

Thus a very realistic display can be achieved giving the impression that the eye point is moving through the simulated snow, enabling wind conditions to affect the generated image, and maintaining the appropriate cubes with regards to both translation and rotation.

In summary, the present invention provides the following features:

1. The simulated vehicle appears to move through the model and a seamless visual flow of particles is perceived.
2. Correct translation axes are obtained for all vehicle motion.
3. Correct rotation axes are obtained for all vehicle motion.
4. Correct axes are obtained for the effects of wind, both steady and gusting.

What is claimed is:

1. A method for simulating the motion of particles in a computer generated image representing the appearance from a predetermined viewing point of a three dimensional worldspace through which the particles move, wherein a three dimensional model is defined which is made up from a regular array of abutting model portions of predetermined dimensions, an object is defined the dimensions of which correspond to the dimensions of each model portion, the object having characteristics such that the object represents the motion of particles through the volume which the object occupies, the three dimensional model is notionally positioned in worldspace such that the viewing point is located within the model, the field of view from the viewing point extends through the model, and a notional point which is in a predetermined location relative to the viewing point is within a selected region of the model, the worldspace model position is translated in steps, the magnitude of each step corresponding to the dimensions of the portions, and the model being translated in response to movements of the viewing point in worldspace so as to maintain the notional point within the selected region, and an image of the worldspace including the model is generated with the object representing the moving particles occupying each portion of the model.

2. A method as in claim 1, wherein the notional point is coincident with the viewing point.

3. A method as in claim 2, wherein the pre-determined region of the model is located centrally relative to the model.

4. A method according to claim 2, wherein the notional point is located on a line which extends from the viewing point in a predetermined direction, the distance between the notional point and the viewing point being a function of the speed of the viewing point.

5. A method as in claim 1, wherein the model is defined as an array of cubes in each of which there is a distribution of particles such that each cube is self similar.

6. A method as in claim 5, wherein each cube is made up from a series of sub-cubes each of which has a different distribution of particles within it.

7. A method as in claim 5, wherein the particles of adjacent cubes overlap.

8. A method as in claim 5, wherein the visibility of individual cubes is faded out with range from the viewing point such that boundaries of the cube structure are concealed.

9. A method as in claim 1, wherein the particles are represented by respective light points.

10. A method as in claim 9, wherein the particles are represented by raster light points.

11. A method as in claim 9, wherein the particles are represented by calligraphic light points.

12. A method as in claim 10, wherein the particles are represented by strings of light points which move together in a predetermined manner.

13. A method as in claim 1, wherein the particles are represented by respective polygons.

14. An apparatus for simulating the motion of particles in a computer generated image representing the appearance from a predetermined viewing point of a three-dimensional worldspace through which the particles move, comprising:

means for defining a three-dimensional model which is made up from a regular array of abutting model portions of predetermined dimensions, means for defining an object the dimensions of which correspond to the dimensions of each model portion, the object having characteristics such that the object represents the motion of particles through the volume which the object represents, means for notionally positioning the three-dimensional model in worldspace such that the viewing point is located within the model, the field of view from the viewing point the model and a notional point which is in a predetermined location relative to the viewing point is within a selected region of the model, means for translating the worldspace model position in steps the magnitude of each step corresponding to a respectively corresponding one the predetermined dimensions of the model portions, the translating means being responsive to movements of the viewing point in worldspace so as to maintain the notional point within the selected region, and means for generating an image of the worldspace including the model with the object representing the moving particles occupying each portion of the model.

* * * * *